(12) United States Patent
Bologna et al.

(10) Patent No.: US 9,405,331 B2
(45) Date of Patent: Aug. 2, 2016

(54) CABLE GROUNDING SYSTEM FOR AN INFORMATION HANDLING SYSTEM

(71) Applicant: Dell Products L.P., Round Rock, TX (US)

(72) Inventors: Benny Bologna, Austin, TX (US); Andrew Thomas Sultenfuss, Leander, TX (US); Sinem Kockan, Austin, TX (US); Jason Morrison, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 14/454,397

(22) Filed: Aug. 7, 2014

(65) Prior Publication Data

US 2016/0044818 A1    Feb. 11, 2016

(51) Int. Cl.
*G06F 1/18* (2006.01)

(52) U.S. Cl.
CPC ........................ *G06F 1/18* (2013.01)

(58) Field of Classification Search
CPC ........................................ H05K 7/14
See application file for complete search history.

(56) References Cited

U.S. PATENT DOCUMENTS

| | | | | |
|---|---|---|---|---|
| 5,090,913 A * | 2/1992 | Kobayashi | ............ | G06F 1/1616 16/337 |
| 5,738,536 A * | 4/1998 | Ohgami | ................ | G06F 1/1616 361/679.4 |
| 5,828,341 A * | 10/1998 | Delamater | ............ | G06F 1/1616 343/702 |
| 6,102,721 A * | 8/2000 | Seto | ...................... | G06F 1/1616 361/679.4 |
| 6,530,784 B1 * | 3/2003 | Yim | ...................... | G06F 1/1616 361/679.29 |
| 6,545,220 B2 * | 4/2003 | Syed | ................... | H02G 3/0481 174/75 C |
| 7,129,931 B2 * | 10/2006 | Pappas | ................. | G06F 1/1601 345/168 |
| 7,572,128 B2 * | 8/2009 | Revelle, II | ........... | H01Q 1/2291 439/404 |
| 7,656,652 B2 * | 2/2010 | Moser | ................... | G06F 1/1616 206/457 |
| 7,952,562 B2 * | 5/2011 | Mundt | ................. | G06F 1/1616 341/22 |
| 2009/0102744 A1* | 4/2009 | Ram | ..................... | G06F 1/1601 345/1.1 |
| 2009/0141439 A1* | 6/2009 | Moser | ................... | G06F 1/1616 361/679.29 |
| 2013/0329394 A1* | 12/2013 | Nonaka | ................ | G06F 1/1616 361/807 |
| 2015/0365747 A1* | 12/2015 | Aurongzeb | ............ | H04R 1/028 381/333 |

* cited by examiner

*Primary Examiner* — Lisa Lea Edmonds
(74) *Attorney, Agent, or Firm* — Jackson Walker L.L.P.

(57) ABSTRACT

An information handling system may include a first member, a second member hingedly coupled to the first member via a hinge, a coaxial cable, and a grounding jacket. The coaxial cable may have a ground sheath and a signal wire internal to the ground sheath, wherein an axis of the signal wire is substantially parallel to a rotational axis of the hinge and wherein the coaxial cable comprises an exposed portion in which the ground sheath is exposed externally to the coaxial cable. The grounding jacket may be mechanically coupled to the first member and the second member, wherein the grounding jacket may be configured to mechanically support the coaxial cable and electrically couple to an electrically conductive portion of at least one of the first member and the second member and to the ground sheath at the exposed portion in order to create an electrically conductive path between the ground sheath and the electrically conductive portion via the grounding jacket.

18 Claims, 7 Drawing Sheets

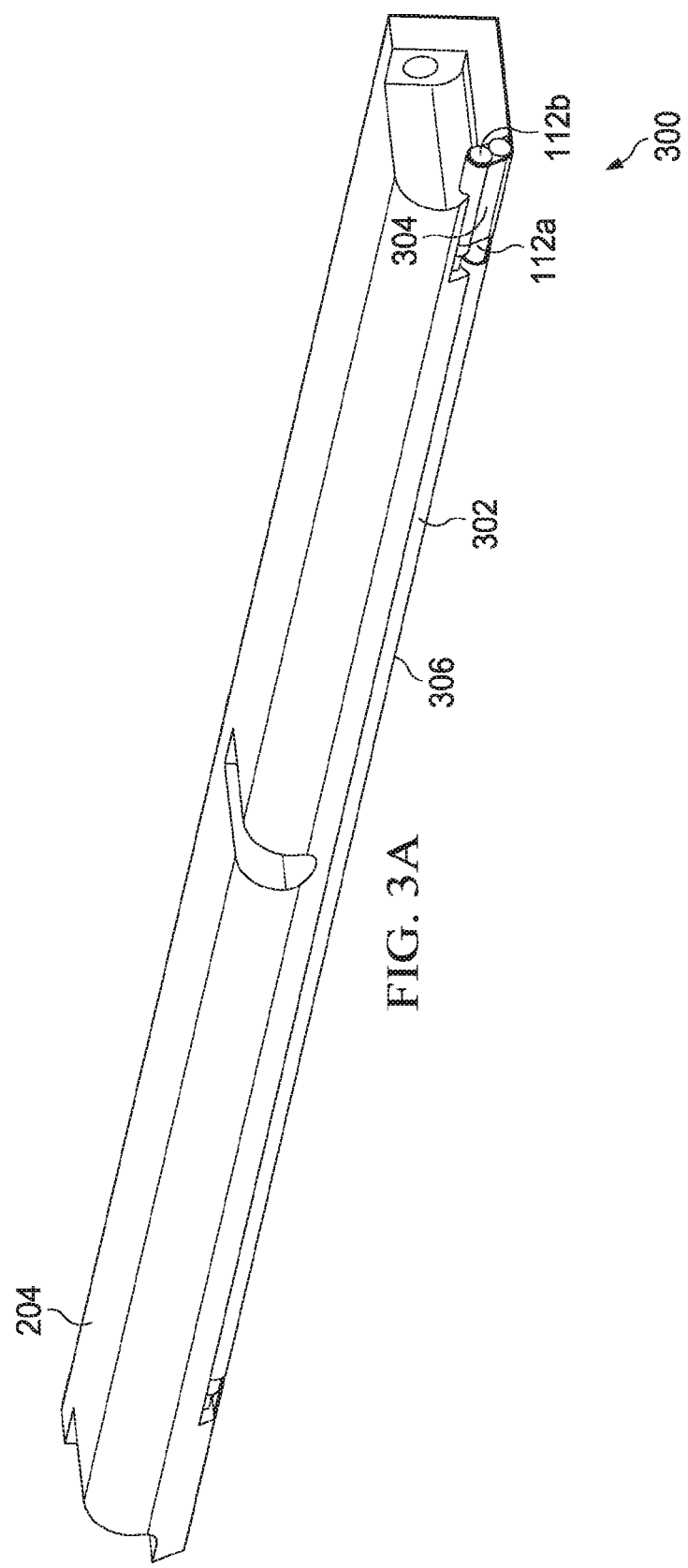

CABLE GROUNDING SYSTEM FOR AN INFORMATION HANDLING SYSTEM

TECHNICAL FIELD

The present disclosure relates in general to information handling systems, and more particularly to grounding an antenna cable used in an information handling system and providing mechanical strain relief to an antenna cable.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may comprise a radio-frequency transceiver for wireless communication to and from the information handling system via mobile telephony (e.g., 2G, 3G, 4G, Long-Term Evolution, etc.), Wireless Fidelity (Wi-Fi), Bluetooth, and/or other radio-frequency communication technologies. Effective communication via radio-frequency transmissions typically requires the use of one or more antennas coupled to the radio-frequency transceiver.

Existing approaches to placing and coupling antennas to radio-frequency transceivers in information handling systems have numerous disadvantages. For example, antennas are often coupled to transceivers via coaxial cables. In existing approaches, often the return path of an antenna coaxial cable is relatively weak, relying on a small mechanical interface of a U.FL/IPEX coaxial connector to a wireless transceiver. Such weak antenna cable grounding may increase susceptibility to electromagnetic noise within the antenna and antenna cable.

In addition, in existing approaches, an antenna may often be coupled to a coaxial cable laced along the axis of the hinge of a notebook computer, and is grounded by exposing portions of the ground sheath of the coaxial cable and soldering such portions to a grounded portion of the chassis of the information handling system. Such soldering adds a process step to manufacture of an information handling system, as soldering to provide sufficient electrical coupling of the ground sheath of the coaxial cable to a ground voltage may be costly.

SUMMARY

In accordance with the teachings of the present disclosure, the disadvantages and problems associated with grounding of antenna cables in information handling systems may be reduced or eliminated.

In accordance with embodiments of the present disclosure, an information handling system may include a first member, a second member hingedly coupled to the first member via a hinge, a coaxial cable, and a grounding jacket. The coaxial cable may have a ground sheath and a signal wire internal to the ground sheath, wherein an axis of the signal wire is substantially parallel to a rotational axis of the hinge and wherein the coaxial cable comprises an exposed portion in which the ground sheath is exposed externally to the coaxial cable. The grounding jacket may be mechanically coupled to the first member and the second member, wherein the grounding jacket may be configured to mechanically support the coaxial cable and electrically couple to an electrically conductive portion of at least one of the first member and the second member and to the ground sheath at the exposed portion in order to create an electrically conductive path between the ground sheath and the electrically conductive portion via the grounding jacket.

In accordance with these and other embodiments of the present disclosure, an information handling system may include a circuit board, an information handling resource mechanically and electrically coupled to the circuit board, coaxial cable, and a bracket. The coaxial cable may comprise a first connector configured to mate with a corresponding second connector of the information handling resource. The bracket may be configured to mechanically couple to the circuit board, such that when mechanically coupled to the circuit board, the bracket is further configured to apply a first force to the first connector to maintain connectivity between the first connector and the second connector.

In accordance with these and other embodiments of the present disclosure, an information handling system may include a circuit board, an information handling resource mechanically and electrically coupled to the circuit board; coaxial cable, and a bracket. The coaxial cable may include a first connector configured to mate with a corresponding second connector of the information handling resource, further wherein the coaxial cable comprises an exposed portion in which a ground sheath of the coaxial cable is exposed externally to the coaxial cable. The bracket may be configured to mechanically couple to the circuit board, such that when mechanically coupled to the circuit board, the bracket is further configured to apply a force to maintain electrical coupling between a ground plane of the circuit board and the ground sheath at the exposed portion.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 3A, 3B, and 3C illustrate different perspective views of an example antenna cable carrier of a keyboard assembly of an information handling system, in accordance with embodiments of the present disclosure;

DETAILED DESCRIPTION

Figure 1:
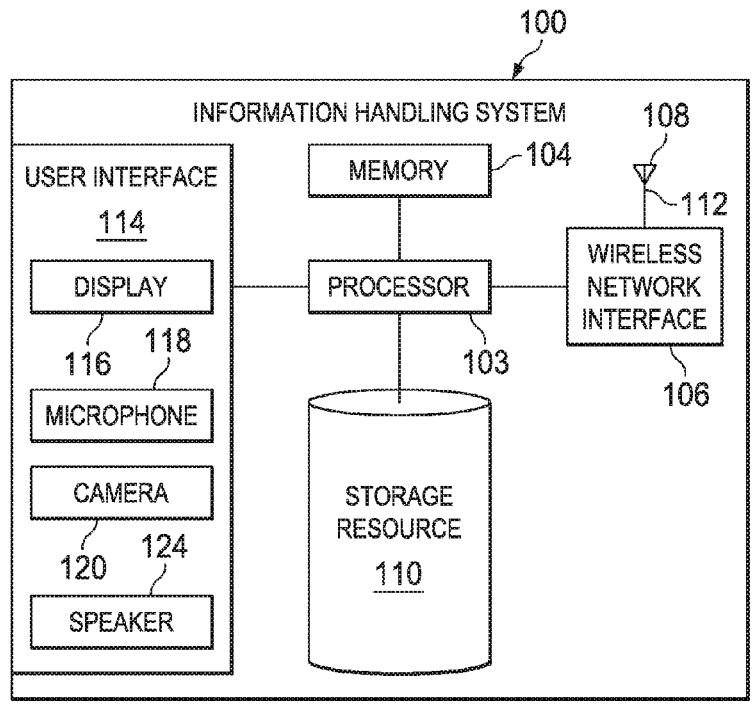
FIG. 1 illustrates a functional block diagram of selected components of an example information handling system, in accordance with embodiments of the present disclosure.

Preferred embodiments and their advantages are best understood by reference to FIGS. 1 through 6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing. For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), Bluetooth, ISO 14443, ISO 15693, or other suitable standard), personal area networks (PAN) (e.g., Bluetooth), local area networks (LAN), wide area networks (WAN), narrowband personal communications services (PCS), mobile telephony technologies, broadband PCS, circuit-switched cellular, cellular digital packet data (CDPD), radio frequencies, such as the 800 MHz, 900 MHz, 1.9 GHz and 2.4 GHz bands, infra-red and laser.

FIG. 1 illustrates a functional block diagram of selected components of an example information handling system 100, in accordance with embodiments of the present disclosure. In some embodiments, information handling system 100 may be a personal computer (e.g., a desktop computer or a portable computer). In other embodiments, information handling system 100 may comprise a mobile device (e.g., smart phone, a tablet computing device, a handheld computing device, a personal digital assistant, or any other device that may be readily transported on a person of a user of such mobile device).

As depicted in FIG. 1, information handling system 100 may include a processor 103, a memory 104 communicatively coupled to processor 103, a storage resource 110 communicatively coupled to processor 103, a wireless network interface 106 communicatively coupled to processor 103, a user interface 114 communicatively coupled to processor 103, and an antenna 108 coupled to wireless network interface 106 via an antenna cable 112.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 110, and/or another component of information handling system 100.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 100 is turned off.

Wireless network interface 106 may include any suitable system, apparatus, or device operable to serve as an interface between its associated information handling system 100 and a network, such that information handling system 100 may communicate signals to and from wireless network interface 106 via wireless transmissions (e.g., mobile telephony, Wi-Fi, Bluetooth, mobile broadband telephony). Accordingly, wireless network interface 106 may include a radio-frequency transceiver and/or other components configured to communicate to and from wireless network interface 106 via wireless transmissions.

Figure 6:
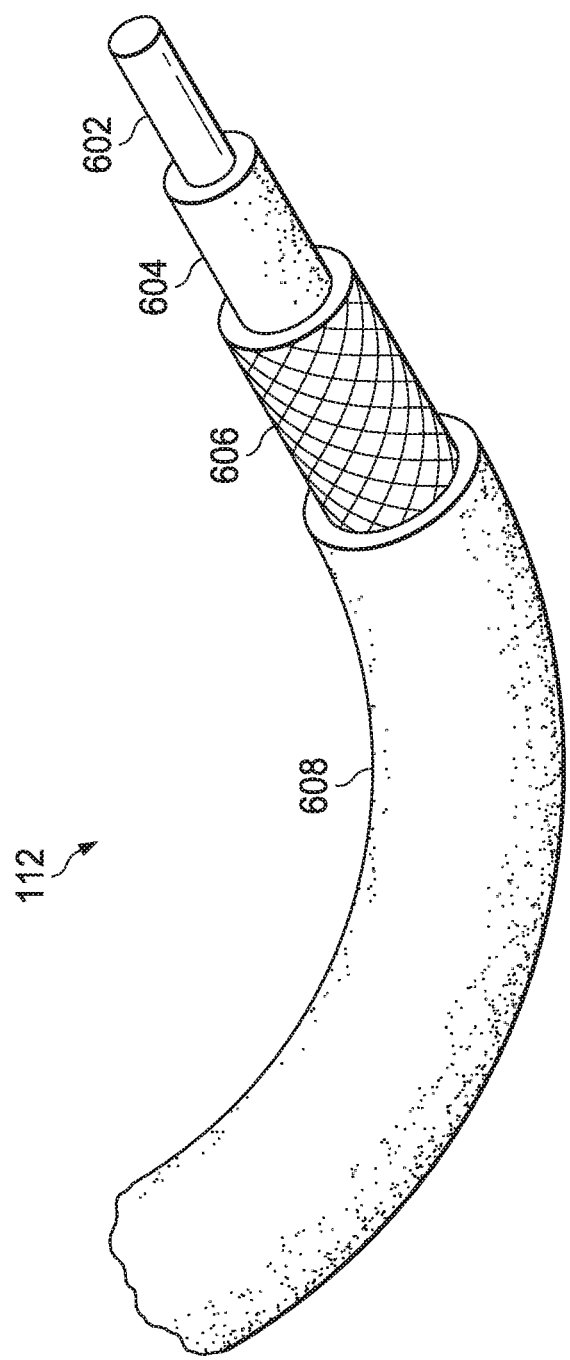
FIG. 6 illustrates an example cable, in accordance with embodiments of the present disclosure.

Antenna 108 may comprise any system, device, or apparatus configured to convert electric power into radio waves, and vice versa. As shown in FIG. 1, antenna 108 may be coupled to wireless network interface 106 via a cable 112. In some embodiments, cable 112 may comprise a coaxial cable. Turning briefly to FIG. 6, in embodiments in which cable 112 is a coaxial cable, cable 112 may comprise a signal wire 602 of conductive material (e.g., copper, aluminum) for carrying an electrical or electronic signal which is surrounded by a layer of insulative material 604 which is in turn surrounded by a ground sheath 606 of conductive material (e.g., copper, aluminum) which may serve as an electrical return path for the electrical or electronic signal communicated via the signal wire. Ground sheath 606 itself may also be surrounded by an electrical insulator 608. Each end of cable 112 may be terminated by a connector for coupling cable 112 to antenna 108 and wireless network interface 106. For example, in some embodiments cable 112 may be terminated at one end with a U.FL connector (also known as an IPEX, IPAX, IPX, AMC, MHF, or UMCC connector) for electrically and mechanically coupling cable 112 to wireless network interface 106.

In some embodiments, antenna 108 may itself comprise a coaxial cable, and in such embodiments, antenna 108 and cable 112 may comprise the same coaxial cable.

Storage resource 110 may include a system, device, or apparatus configured to store data. Storage resource 110 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 110 may include one or more storage enclosures configured to hold and/or power one or more of such devices. In the embodiments represented by FIG. 1, storage resource 110 may reside within information handling system 100. However, in other embodiments, storage resource 110 may reside external to information handling system 100 (e.g., may be coupled to information handling system 100 via a network).

User interface 114 may comprise any instrumentality or aggregation of instrumentalities by which a user may interact with information handling system 100. For example, user interface 114 may permit a user to input data and/or instructions into information handling system 100 (e.g., via a keypad, keyboard, touch screen, microphone, camera, and/or other data input device), and/or otherwise manipulate information handling system 100 and its associated components. User interface 114 may also permit information handling system 100 to communicate data to a user (e.g., via a display device, speaker, and/or other data output device). As shown in FIG. 1, user interface 114 may include one or more of a display 116, microphone 118, camera 120, and speaker 124.

Display 116 may comprise any suitable system, device, or apparatus configured to display human-perceptible graphical data and/or alphanumeric data to a user. For example, in some embodiments, display 116 may comprise a liquid crystal display.

Microphone 118 may comprise any system, device, or apparatus configured to convert sound incident at microphone 118 to an electrical signal that may be processed by processor 103. In some embodiments, microphone 118 may include a capacitive microphone (e.g., an electrostatic microphone, a condenser microphone, an electret microphone, a microelectromechanical systems (MEMs) microphone, etc.) wherein such sound is converted to an electrical signal using a diaphragm or membrane having an electrical capacitance that varies as based on sonic vibrations received at the diaphragm or membrane.

Camera 120 may comprise any system, device, or apparatus configured to record images (moving or still) into one or more electrical signals that may be processed by processor 103.

Speaker 124 may comprise any system, device, or apparatus configured to produce sound in response to electrical audio signal input.

In addition to processor 103, memory 104, wireless network interface 106, antenna 108, storage resource 110, and user interface 114, information handling system 100 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
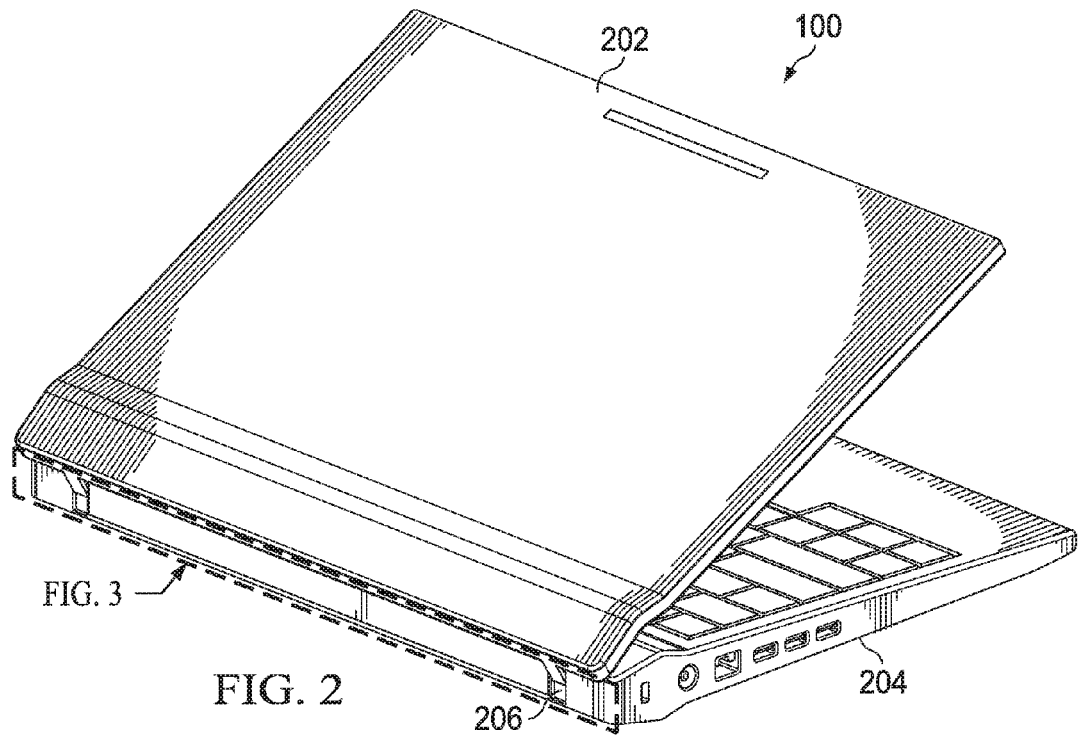
FIG. 2 illustrates an exterior view of an example information handling system, in accordance with embodiments of the present disclosure.

FIG. 2 illustrates an exterior view of example information handling system 100, in accordance with embodiments of the present disclosure. Although FIG. 2 depicts information handling system 100 as a laptop or notebook computer, information handling system 100 may comprise any type of information handling system (e.g., a mobile device sized and shaped to be readily transported and carried on a person of a user of information handling system 100, a desktop computer, a tower computer, a server, etc.), and methods and systems disclosed, described, and claimed herein may not be limited to application to a laptop or notebook computer.

As depicted in FIG. 2, information handling system 100 may include a display assembly 202 and a keyboard assembly 204 hingedly coupled via one or more hinges 206. Each of display assembly 202 and keyboard assembly 204 may be integral parts of a chassis or case for information handling system 100. Each of display assembly 202 and keyboard assembly 204 may have an enclosure made from one or more suitable materials, including without limitation plastic, steel, and/or aluminum. Although information handling system 100 is shown in FIG. 2 as having certain components (e.g., display assembly 202, keyboard assembly 204, and hinge 206), information handling system 100 may include any other suitable components which may not have been depicted in FIG. 2 for the purposes of clarity and exposition. In operation, information handling system 100 may be translated between a closed position (e.g., a position of display assembly 202 relative to keyboard assembly 204 such that display assembly 202 substantially overlays keyboard assembly 204, or vice versa) and an open position (e.g., a position of display assembly 202 relative to keyboard assembly 204 such that display assembly 202 does not substantially overlay keyboard assembly 204, or vice versa, such as when the angle formed by display assembly 202 and keyboard assembly 204 at hinge 206 is substantially non zero).

Figure 3B:
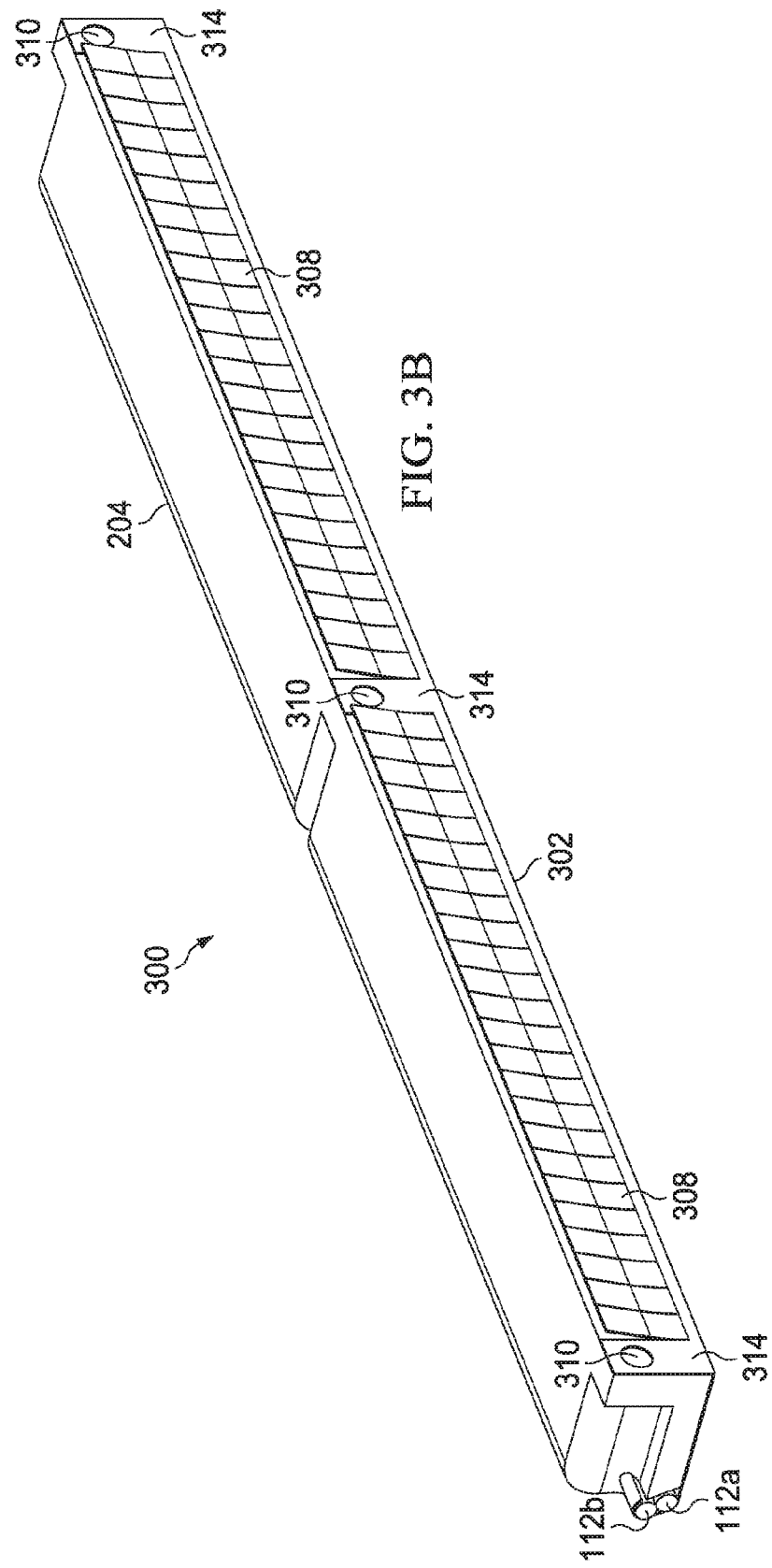

FIGS. 3A and 3B illustrate different views of an antenna cable carrier 300 of keyboard assembly 204 with some portions of keyboard assembly 204 cut away, in accordance with embodiments of the present disclosure. For the purposes of exposition, antenna cable carrier 300 is shown as an integral part of keyboard assembly 204. In other embodiments, antenna cable carrier 300 could be integral to display assembly 202, or a hinge assembly for coupling display assembly 202 to keyboard assembly 204.

As shown in FIGS. 3A and 3B, antenna cable carrier 300 may be configured to carry one or more antenna cables 112

(e.g., cables 112a, 112b) such that the axial length of such antenna cables 112 runs substantially perpendicular to the axial length of hinge 206. In the embodiments represented by FIGS. 3A and 3B, one or more cables 112 may comprise a coaxial cable. Also as shown in FIGS. 3A and 3B, antenna cable carrier 300 may include a grounding jacket 302 for grounding a ground sheath (e.g., ground sheath 606 as shown in FIG. 6) of one or more cables 112 to portions of display assembly 202 and/or keyboard assembly 204, as described in greater detail below.

Figure 3C:
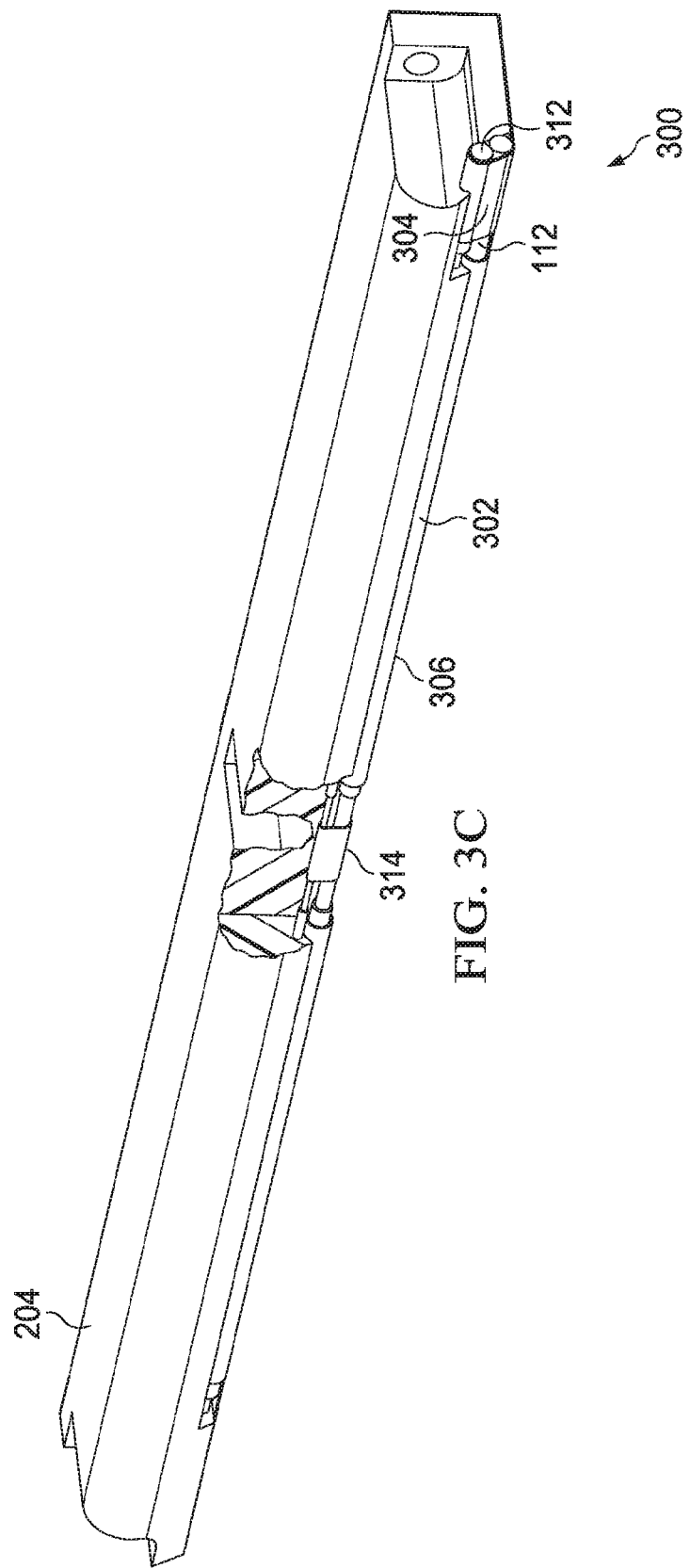

In addition to antenna cables, antenna cable carrier 300 may be configured to carry a ground wire 312, as shown in FIG. 3C. For example, as shown in FIG. 3C, wire 312 may comprise an insulated wire electrically coupled to a ground potential. A portion of the antenna cable 112 (e.g., insulation 608 as shown in FIG. 6) may be exposed to expose the ground sheath (e.g., ground sheath 606 as shown in FIG. 6) thereof, and a corresponding portion of ground wire 312 may be exposed, such that these exposed portions may be electrically coupled directly to one another or via a tap 314 of conductive material between the two.

Figure 4:
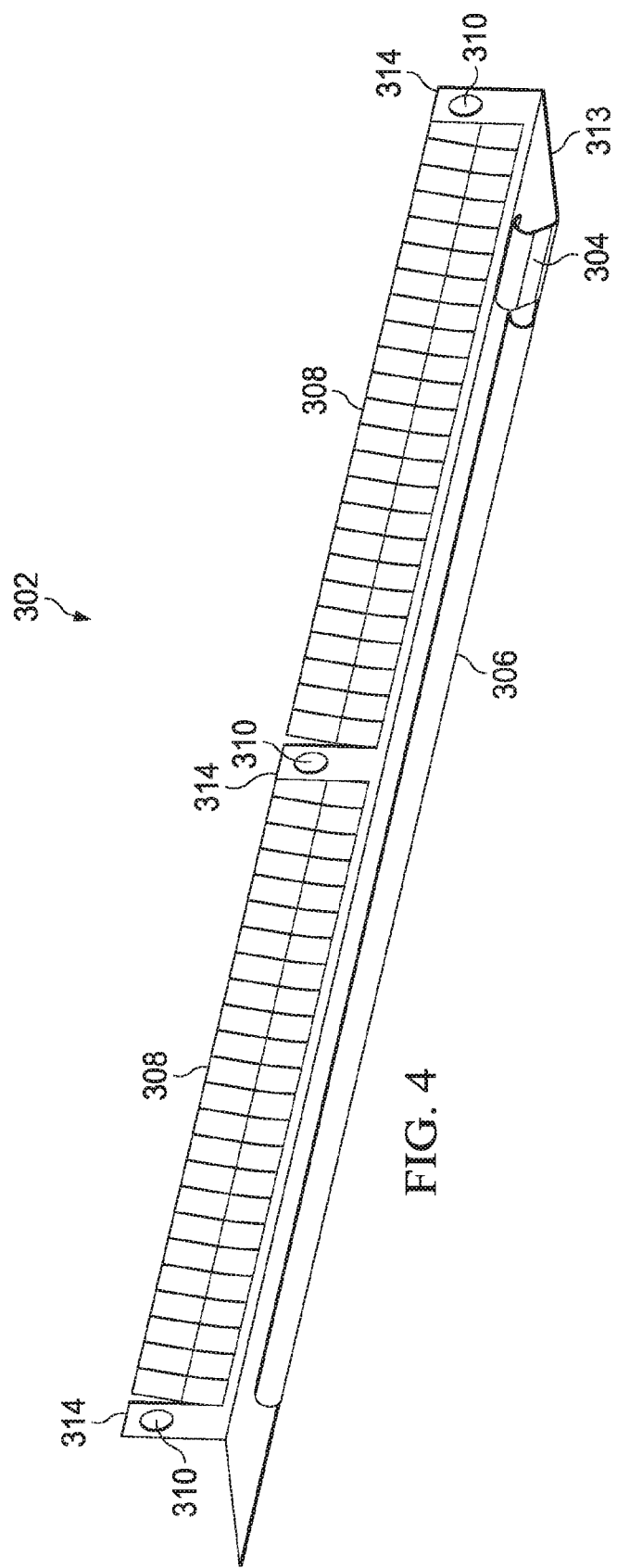
FIG. 4 illustrates an isolated view of an example grounding jacket, in accordance with embodiments of the present disclosure.

FIG. 4 illustrates an isolated view of an example grounding jacket 302, in accordance with embodiments of the present disclosure. Grounding jacket 302 may be constructed from any suitable electrically conductive material (e.g., copper, aluminum). Referring to FIGS. 3A, 3B, and 4, grounding jacket 302 may include a web 313, grounding clips 304 and 306, fingers 308, flanges 314, and openings 310. Grounding clips 304 and 306 may comprise U-shaped or hook-shaped projections from web 313 configured to mechanically hold cables 112 in place, as well as electrically couple to exposed portions of the respective ground sheaths (e.g., ground sheath 606 as shown in FIG. 6) of cables 112. One or more flanges 314 may extend perpendicularly from web 313, and may include openings 310 for fastening (e.g., via a screw or other suitable fastener) grounding jacket 302 to antenna cable carrier 300. Also extending from the same edge of web 313 as flanges 314 may be fingers 308. Fingers may be configured to electrically couple to an electrically conductive portion of display assembly 202 (e.g., metal integral to display assembly 202) which is coupled to a ground voltage.

In operation, grounding jacket 302 may be placed within antenna cable carrier 300 so as to create a spring force to maintain electrical contact between grounding clips 304, 306 and exposed portions of the respective grounding sheaths (e.g., ground sheath 606 as shown in FIG. 6) of cables 112. In addition, grounding jacket 302 may be placed within antenna cable carrier 300 such that fingers 308 create a spring force against an electrically conductive portion of display assembly 202 which is coupled to a ground voltage. As a result, grounding jacket 302 may ground a grounding sheath (e.g., ground sheath 606 as shown in FIG. 6) of a cable 108 substantially along the length of the cable 108 without the use of solder.

Figure 5A:
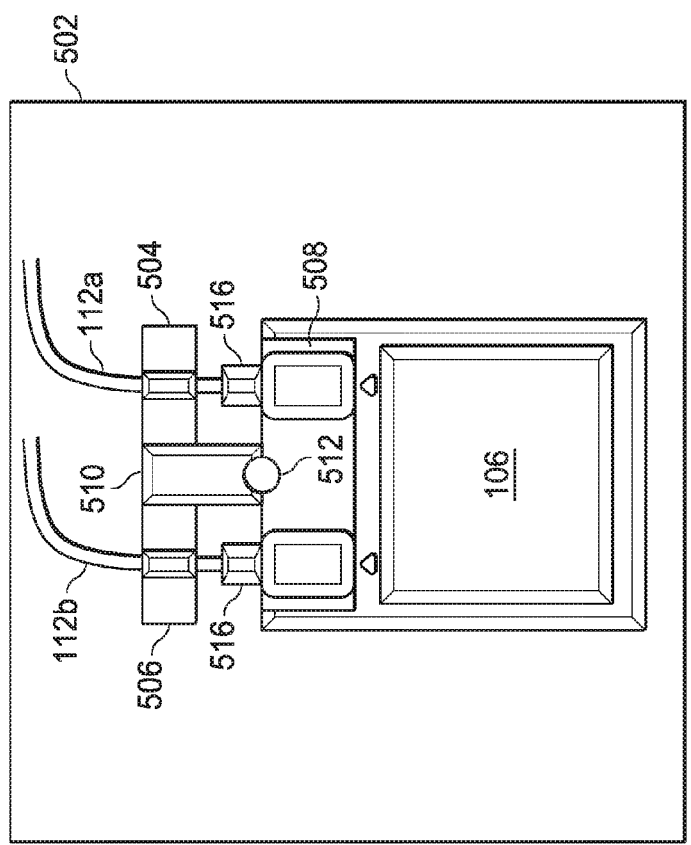
FIGS. 5A and 5B illustrate different views of a portion of a circuit board for coupling an antenna cable to a wireless network interface, in accordance with embodiments of the present disclosure.
Figure 5B:
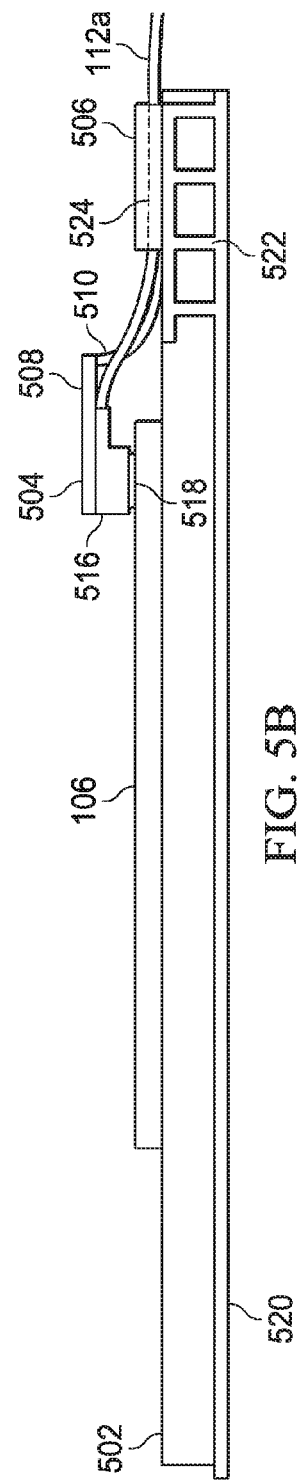

FIGS. 5A and 5B illustrate different views of a portion of a circuit board 502 for coupling one or more antenna cables 112 to wireless network interface 106, in accordance with embodiments of the present disclosure. FIG. 5A depicts a top-down plan view, while FIG. 5B depicts a side elevation view.

Circuit board 502 may include any suitable system, device, or apparatus operable to mechanically support and electrically couple electronic components (e.g., packaged integrated circuits) making up an information handling system. For example, circuit board 502 may be used as part of a motherboard for information handling system 100. As used herein, the term "circuit board" includes printed circuit boards (PCBs), printed wiring boards (PWBs), etched wiring boards, and/or any other board or similar physical structure operable to mechanically support and electrically couple electronic components. Circuit board 502 may include a plurality of pads and traces. Pads may comprise a conductive material and may be formed on a surface of circuit board 502. Further, each pad may be operable to receive a pin of an electronic component (e.g., a packaged integrated circuit or other information handling resource) and provide electrical connectivity between the pin and one or more traces. Traces may comprise a conductive material and may be formed on a surface of circuit board 502, or in a layer of circuit board not visible from the surface thereof. Further, each trace may be operable to provide conductive pathways between electronic components mounted to pads.

A circuit board 502 is not limited to having components on just one side thereof. Traces and pads may be formed on either side of circuit board 502. In addition, circuit board 502 may comprise a plurality of conductive layers separated and supported by layers of insulating material laminated together, and traces may be disposed on and/or in any of such conductive layers. Connectivity between conductive elements disposed on and/or in various layers of circuit board 502 may be provided by conductive vias.

The various pads, traces, and vias may comprise silver, copper, aluminum, lead, nickel, other metals, metal alloys, and/or any other conductive material that may readily conduct electrical current.

As shown in FIGS. 5A and 5B, wireless network interface 106 may be mechanically mounted and electrically coupled to circuit board 502. Although not explicitly shown, multiple pins of wireless network interface 106 may electrically couple to corresponding pads of circuit board 502. Wireless network interface 106 may also include a one or more connectors 518 for mating with respective corresponding connectors 516, wherein such connectors 516 each terminate a respective antenna cable 112 (e.g., cables 112a and 112b), thus coupling wireless network interface 106 to antenna cables 112 (which may in turn be coupled to corresponding antennas 108). One or more of connectors 516 and 518 may comprise a U.FL connector (also known as an IPEX, IPAX, IPX, AMC, MHF, or UMCC connector).

To provide for mechanical strain relief and grounding of antenna cables 112, a bracket 504 may be utilized. Bracket 504 may comprise an electrically conductive material (e.g., copper or aluminum). Bracket 504 may include a connector portion 508, an intermediate portion 510, a ground plane portion 506, and a fastener hole 512.

Fastener hole 512 may be configured to receive a screw or other fastener for mechanically attaching bracket 504 to circuit board 502 via a corresponding hole or other receptacle of circuit board 502. In some embodiments, such hole or other receptacle of circuit board 502 may be configured such that when a screw or other fastener is inserted into such hole or other receptacle, such screw or other fastener is electrically coupled to a ground plane of circuit board 502.

Prior to attachment of bracket 504 to circuit board 502, a portion of each cable 112 may be stripped to expose the ground sheath (e.g., ground sheath 606 as shown in FIG. 6) of cable 112 at such portion. When bracket 504 is mechanically coupled to circuit board 502, ground plane portion 506 may apply pressure to cables 112 such that the exposed ground sheaths (e.g., ground sheath 606 as shown in FIG. 6) of cables 112 are electrically coupled to a ground plane 520 of circuit board 502. For example, in some embodiments, circuit board 502 may have traces 524 coupled to a ground plane 520 by vias 522, such that exposed ground sheaths (e.g., ground sheath 606 as shown in FIG. 6) of cables 112 are coupled to ground plane 520 by way of ground plane portion 506 applying pressure to press exposed ground sheaths against traces 524.

Intermediate portion 510 and connector portion 508 may be configured such that when bracket 504 is attached to circuit board 502, connector portion 508 applies a downward force on connectors 516, further securing connectors 516 to corresponding connectors 518.

Although the present disclosure has been described in detail, it should be understood that various changes, substitutions, and alterations can be made hereto without departing from the spirit and the scope of the disclosure as defined by the appended claims. For example, although the present disclosure contemplates a hinge coupling a keyboard assembly to a display assembly, some embodiments may include a hinge coupling any two mechanical members to each other.

What is claimed is:

1. An information handling system comprising:
   a first member;
   a second member hingedly coupled to the first member via a hinge;
   a coaxial cable, wherein the coaxial cable has a ground sheath and a signal wire internal to the ground sheath, wherein an axis of the signal wire is substantially parallel to a rotational axis of the hinge and wherein the coaxial cable comprises an exposed portion in which the ground sheath is exposed externally to the coaxial cable; and
   a grounding jacket mechanically coupled to the first member and the second member, the grounding jacket configured to:
   mechanically support the coaxial cable; and
   electrically couple to an electrically conductive portion of at least one of the first member and the second member and to the ground sheath at the exposed portion in order to create an electrically conductive path between the ground sheath and the electrically conductive portion via the grounding jacket.

2. The information handling system of claim 1, wherein the grounding jacket comprises at least one grounding clip configured to:
   mechanically support the coaxial cable; and
   apply a force to maintain electrical contact between the grounding jacket and the ground sheath at the exposed portion.

3. The information handling system of claim 2, wherein the grounding clip comprises at least one of a hook-shaped and a U-shaped projection from a web of the grounding jacket.

4. The information handling system of claim 1, wherein the grounding jacket comprises one or more fingers configured to apply a force to maintain electrical contact between the grounding jacket and the electrically conductive portion.

5. The information handling system of claim 1, wherein the first member comprises a keyboard assembly.

6. The information handling system of claim 1, wherein at least one of the first member and the second member comprises a display assembly.

7. The information handling system of claim 1, further comprising a ground wire, wherein an axis of the ground wire is substantially parallel to the axis of the signal wire and wherein the ground wire comprises an exposed portion coupled at the exposed portion of the ground wire to a corresponding exposed portion of the ground sheath.

8. An information handling system comprising:
   a circuit board;
   an information handling resource mechanically and electrically coupled to the circuit board;
   a coaxial cable comprising a first connector configured to mate with a corresponding second connector of the information handling resource; and
   a bracket configured to mechanically couple to the circuit board, such that when mechanically coupled to the circuit board, the bracket is further configured to apply a first force to the first connector to maintain connectivity between the first connector and the second connector.

9. The information handling system of claim 8, wherein the coaxial cable comprises an exposed portion in which a ground sheath of the coaxial cable is exposed externally to the coaxial cable and the bracket is further configured to apply a second force to maintain electrical coupling between a ground plane of the circuit board and the ground sheath at the exposed portion.

10. The information handling system of claim 8, wherein the information handling resource comprises a wireless network interface.

11. The information handling system of claim 9, the bracket comprising:
    a connector portion configured to apply the first force to the first connector to maintain connectivity between the first connector and the second connector; and
    a ground plane portion configured to apply the second force to maintain electrical coupling between the ground plane of the circuit board and the ground sheath at the exposed portion.

12. The information handling system of claim 11, the bracket further comprising an intermediate portion configured to mechanically couple the connector portion to the ground plane portion.

13. The information handling system of claim 11, the bracket further comprising an opening for receiving a fastener for fastening the bracket to the circuit board.

14. The information handling system of claim 13, wherein the circuit board is configured such that when the fastener fastens the bracket to the circuit board, the fastener electrically couples the bracket to the ground plane of the circuit board.

15. An information handling system comprising:
    a circuit board;
    an information handling resource mechanically and electrically coupled to the circuit board;
    a coaxial cable comprising a first connector configured to mate with a corresponding second connector of the information handling resource, further wherein the coaxial cable comprises an exposed portion in which a ground sheath of the coaxial cable is exposed externally to the coaxial cable; and
    a bracket configured to mechanically couple to the circuit board, such that when mechanically coupled to the circuit board, the bracket is further configured to apply a force to maintain electrical coupling between a ground plane of the circuit board and the ground sheath at the exposed portion.

16. The information handling system of claim 15, wherein the information handling resource comprises a wireless network interface.

17. The information handling system of claim 15, the bracket further comprising an opening for receiving a fastener for fastening the bracket to the circuit board.

18. The information handling system of claim 17, wherein the circuit board is configured such that when the fastener fastens the bracket to the circuit board, the fastener electrically couples the bracket to the ground plane of the circuit board.

* * * * *